United States Patent
Frederiksen et al.

(10) Patent No.: US 8,965,463 B2
(45) Date of Patent: Feb. 24, 2015

(54) ENERGY SAVING IN A MOBILE COMMUNICATIONS NETWORK

(75) Inventors: Frank Frederiksen, Klarup (DK); Sabine Rossel, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/811,325

(22) PCT Filed: Jul. 19, 2010

(86) PCT No.: PCT/EP2010/060420
§ 371 (c)(1),
(2), (4) Date: Jun. 10, 2013

(87) PCT Pub. No.: WO2012/010194
PCT Pub. Date: Jan. 26, 2012

(65) Prior Publication Data
US 2013/0258927 A1    Oct. 3, 2013

(51) Int. Cl.
*H04M 1/00* (2006.01)
*H04W 52/02* (2009.01)
*H04L 5/00* (2006.01)

(52) U.S. Cl.
CPC .......... *H04W 52/0203* (2013.01); *H04L 5/003* (2013.01); *Y02B 60/50* (2013.01)
USPC ....................................... 455/574; 455/127.5

(58) Field of Classification Search
USPC .................. 455/73, 561, 572, 574, 127.5
See application file for complete search history.

(56) References Cited

U.S. PATENT DOCUMENTS

| | | | |
|---|---|---|---|
| 2010/0093288 A1* | 4/2010 | Pan et al. | 455/68 |
| 2013/0188531 A1* | 7/2013 | Zhang | 370/280 |

FOREIGN PATENT DOCUMENTS

| | | | | |
|---|---|---|---|---|
| WO | WO 03/034599 A2 | 4/2003 | | |
| WO | WO 03/034600 A2 | 4/2003 | | |
| WO | WO 2009031955 A1 * | 3/2009 | | H04W 52/02 |

OTHER PUBLICATIONS

TSG-R1#3(99)250, TSG-RAN Working Group 1 Meeting #3, Nynashamn (Sweden), Mar. 22-25, 1999, "Discussion on DTX usage in downlink", Nortel Networks, 2 pgs.

* cited by examiner

*Primary Examiner* — Curtis A Alia
(74) *Attorney, Agent, or Firm* — Harrington & Smith

(57) ABSTRACT

In an apparatus of a mobile communications network, time domain fractions of a transmission time interval, which are to be used for transmission of information relating to network operation, are determined as first symbols and the rest of the time domain fractions of the transmission time interval are determined as second symbols, and specific symbols of the second symbols are determined for non-transmission of data. User data is transmitted to a user equipment using respective ones of the first symbols in sub-carriers of a physical resource block scheduled for the user equipment which sub-carriers do not transmit the information relating to network operation in the respective ones of the first symbols, and using the second symbols other than the specific symbols in each of the sub-carriers, and transmission on the specific symbols is inhibited in each of the sub-carriers.

13 Claims, 5 Drawing Sheets

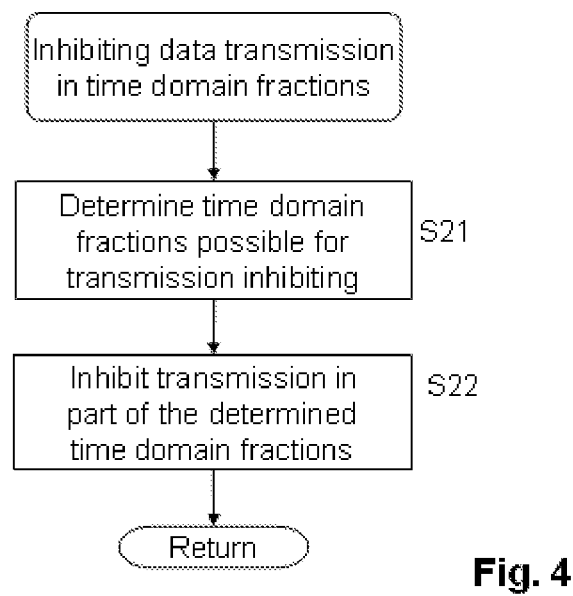

ENERGY SAVING IN A MOBILE COMMUNICATIONS NETWORK

BACKGROUND OF THE INVENTION

1. Field of the Invention

The present invention relates to energy saving in a mobile communications network. For example, the invention can be applied to LTE (long term evolution) and LTE-advanced systems.

2. Description of Related Art

There are different methods of potentially offering energy savings to a network operator, which include centrally controlled network optimizations, self-optimizing network methods and eNB based optimizations.

The centrally controlled network optimizations comprise e.g. sector, site, or even sub-network switch-off at least for some frequency bands during low traffic periods. The self-optimizing network methods include antenna tilting and alternating site switch-off, etc. And the eNB based optimizations comprise optimization of baseband processing resources in low traffic situations, optimization of power amplifier efficiency, local adjustment of transmit bandwidth, local adjustment of time of transmission e.g. through MBMS (multimedia broadcast/multicast service) subframe configurations, and local reduction of number of active transmit antenna ports.

A direct and efficient method for enhancing power amplifier efficiency includes providing DTX (discontinuous transmission) phases already on a Layer 1 (L1) of an LTE air interface.

DTX phases (so-called "blank subframes") through MBMS configurations as used in an LTE Release 10 network may, however, impact LTE Release 8 UEs (user equipments), even that the UEs may not be connected to a cell of the network (using blank subframes). This is because measurements e.g. for handover or for RRC (radio resource control) connection establishment will indicate a lower RSRP (received signal reference power) than is the case, and cause the UEs to start measuring for handover candidates at a premature time in terms of handover. This may cause increased UE power consumption, call-drops in the worst case, and visibly lower network reliability.

Higher level optimizations such as switching off cells completely have also been proposed, but such proposals suffer from the cell's ability to 'wake up' in case there is traffic in the vicinity of the cell center, or in the cell coverage area.

The present invention aims at providing eNB energy savings while allowing backward compatibility in terms of Release 8 UE measurements for mobility, and providing possibility to Release 10 UEs for some data transmission in subframes.

This is achieved by the apparatus and method as defined in the appended claims. The invention may also be implemented as a computer program product.

BRIEF SUMMARY OF THE INVENTION

According to an embodiment of the invention, energy savings at the eNB side for LTE Release 10 and beyond can be achieved in a transparent manner to UEs for both data transmission and mobility measurements, since CRSS (cell-specific reference signals) are still transmitted. Resources are allocated/over-provisioned such that puncturing applied for energy saving purposes through symbol level DTX still allows data transmission, though with a reduced spectral efficiency.

BRIEF DESCRIPTION OF THE DRAWINGS

In the following the invention is described by way of embodiments thereof taking into account the accompanying drawings, in which:

FIG. 4 shows a flow chart illustrating a method of inhibiting data transmission in time domain fractions of a transmission time interval for power saving according to an embodiment of the invention.

DETAILED DESCRIPTION OF THE INVENTION

Figures 1, 2A:
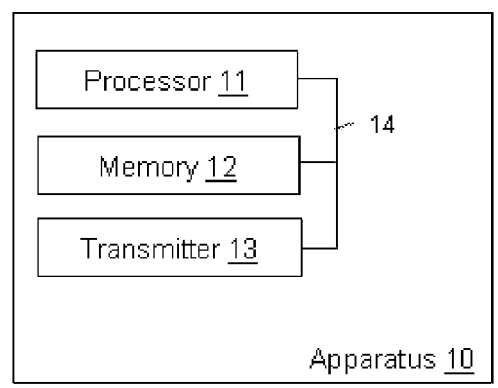
FIG. 1 shows a schematic block diagram illustrating a structure of an apparatus according to an embodiment of the invention.

As a preliminary matter before exploring details of various implementations, reference is made to FIG. 1 for illustrating a simplified block diagram of an apparatus 10 suitable for use in practicing the exemplary embodiments of this invention.

The apparatus 10 is part of a mobile communications network and includes a processor 11, a memory 12 that stores a program, and a suitable radio frequency (RF) transmitter 13 coupled to one or more antennas (not shown) which may be part of a transceiver for bidirectional wireless communications over one or more wireless links with UEs. The processor 11, the memory 12 and the transmitter 13 are linked by a bus 14. The apparatus 10 may be an eNB e.g. of an LTE network.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The program stored in the memory 12 may include program instructions that, when executed by the processor 11, enable the apparatus to operate in accordance with the exemplary embodiments of this invention, as detailed below. Inherent in the processor 11 is a clock to enable synchronism among the various apparatus for transmissions and receptions within the appropriate time intervals and slots required, as the scheduling grants and the granted resources/subframes are time dependent. The transmitter 13 includes a modulator/demodulator commonly known as a modem.

In general, the exemplary embodiments of this invention may be implemented by computer software stored in the memory 12 and executable by the processor 11 of the apparatus 10, or by hardware, or by a combination of software and/or firmware and hardware.

The memory 12 may be of any type suitable to the local technical environment and may be implemented using any suitable data storage technology, such as semiconductor-based memory devices, magnetic memory devices and systems, optical memory devices and systems, fixed memory and removable memory. The processor 11 may be of any type suitable to the local technical environment, and may include one or more of general purpose computers, special purpose computers, microprocessors, digital signal processors (DSPs) and processors based on a multi-core processor architecture, as non-limiting examples.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

According to an embodiment of the invention, energy savings are provided based on L1 modifications as well as on RF (radio frequency) hardware capabilities. Such energy savings may be provided for any radio system that allows for time domain switching off transmission of symbols as will be described below. Examples of such systems are GSM (global system for mobile communication), LTE release 8 and 9, LTE-Advanced (release 10), and further releases.

In particular, according to an embodiment of the invention, an intra-TTI (transmission time interval) muting or puncturing scheme is introduced, where some OFDM (orthogonal frequency division multiplex) symbols of a TTI are deliberately muted in order to allow for micro-DTX in an eNB, where most of an OFDM symbol is muted. By choosing appropriate transmission parameters combined with the muting operation it is possible to provide LTE Release 8 like performance in terms of handover measurements, while at the same time being able to provide some energy savings at the eNB.

In a mobile communications network, the network energy saving feature may only be considered by an eNB in case traffic in a cell is sufficiently low. In the following it is assumed that there is only one UE available for downlink scheduling by the eNB. It should be noted that the principles introduced here are easily expanded to the case of multiple UEs available for downlink scheduling by the eNB.

A 1.4 MHz system bandwidth, i.e. six physical resource blocks (PRBs), is considered between the eNB and the UE, and the user to be scheduled needs two PRBs for proper transmission of needed data. It is to be noted that with any given number of users, there should be some spare frequency resources available, preferably around half the resources, but less can also be used.

Figure 2B:
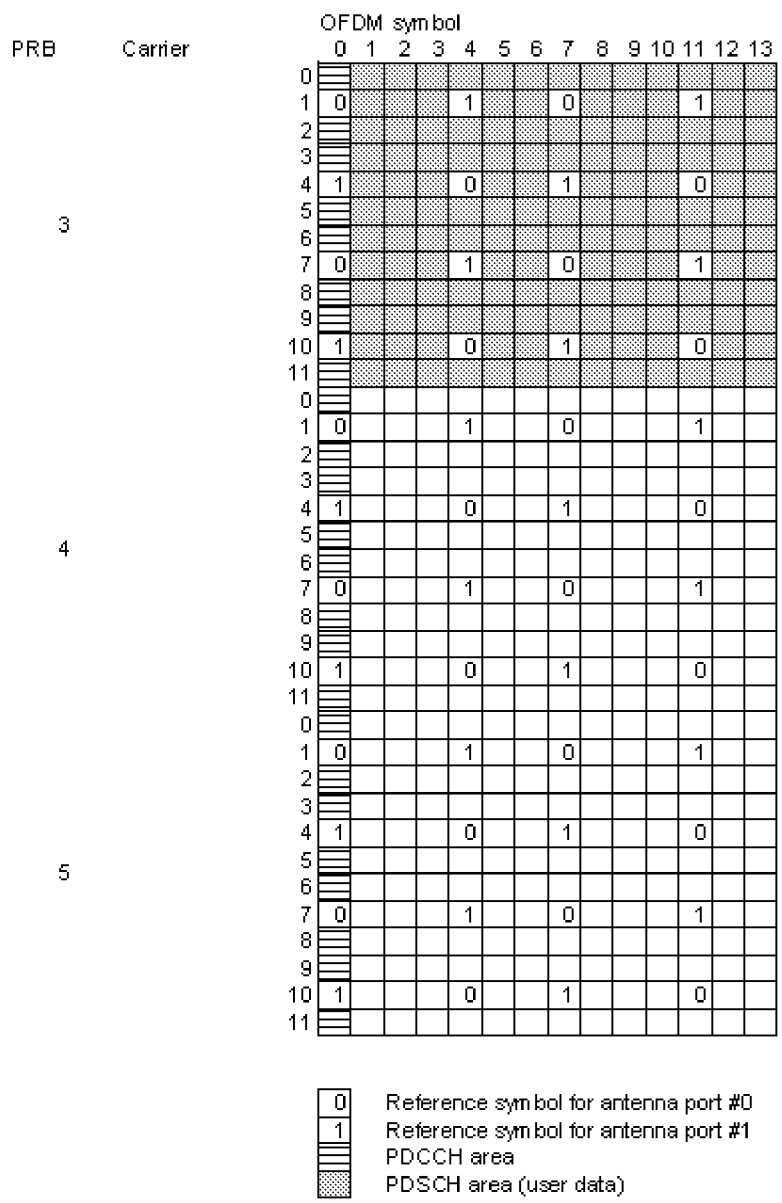
FIG. 2 consisting of FIGS. 2A and 2B shows a schematic diagram illustrating a PRB allocation for a single user requesting two PRBs for transmission in a 1.4 MHz system bandwidth configuration.

The eNB would normally be transmitting for the full duration of the TTI to the user with two PRB allocation, i.e. over 13 OFDM symbols of totally available 14 OFDM symbols for combined control (PDCCH (physical downlink control channel)) and data (PDSCH (physical downlink shared channel)), as shown in FIG. 2 by PDSCH areas (user data). Further, it is assumed that the target MCS (modulating and coding scheme) for current channel conditions is QPSK (quadrature phase shift keying) at a code rate of approximately ⅔. Since the original code rate of the LTE turbo code is ⅓, this means that the transmitted signal is punctured to meet the target code rate. In this puncturing operation, information that is useful for the successful decoding is deliberately discarded to have relative high initial data rate.

In this case, according to an embodiment of the invention, the bandwidth of the transmission is multiplied by a factor of 3 in order to utilize the full transmission bandwidth of 6 PRBs. As the number of available resources on the transmission channel is increased by a factor of 3, the resulting code rate after rate matching will be lowered to rate 2/9, which corresponds to rate 1/(4.5). Now, the channel coding is much stronger, as all redundancy information is available and some information is even repetition coded to match the channel capacity, and the channel decoding at the UE side will also better be able to recover in case parts of the transmitted (and received) signal is missing.

Figure 3A:
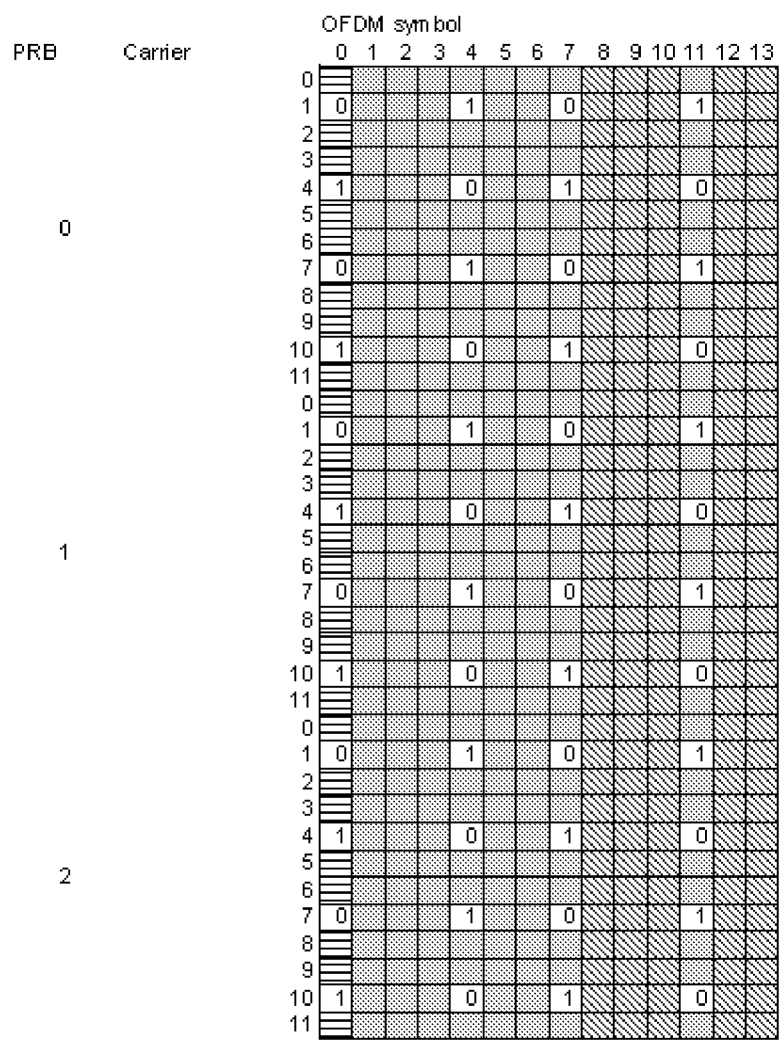
FIG. 3 consisting of FIGS. 3A and 3B shows a schematic diagram illustrating an eNB muting principle through bandwidth expansion according to an implementation example of the present invention.
Figure 3B:
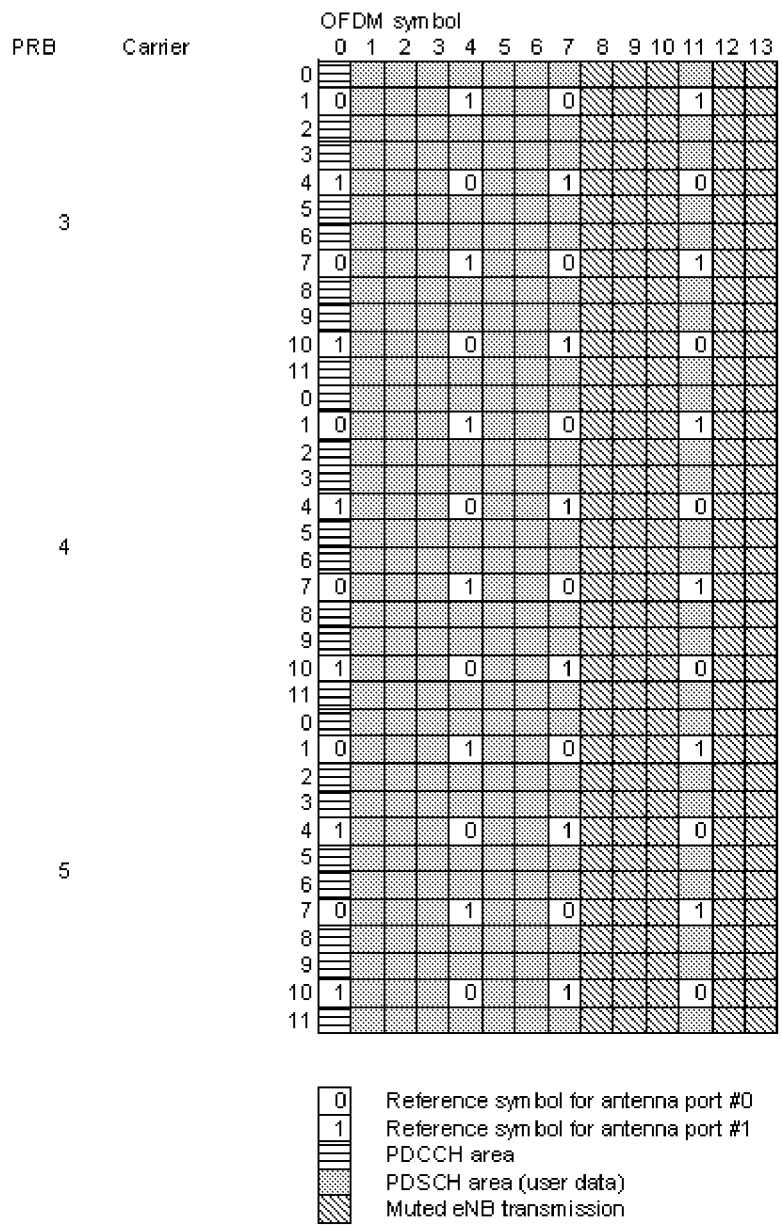

FIG. 2 shows the case of the two PRB transmission, while an implementation example of the invention is illustrated in FIG. 3. With the approach illustrated in FIG. 2, there are 288 resource elements available for carrying the PDSCH as shown by the PDSCH areas (user data) in FIG. 2, while with the approach illustrated in FIG. 3 it is possible to carry the PDSCH using 504 resource elements as shown by the PDSCH areas (user data) in FIG. 3. Some of these additional resources may be needed to compensate for the punctured bits that are missing at the receiver end. In FIGS. 2 and 3, resource elements are indicated as small boxes, where small boxes marked with 0 indicate reference signals for an antenna port #0, small boxes marked with 1 indicate reference signals for an antenna port #1, small boxes with horizontal stripes indicate PDCCH areas, and small boxes coloured grey indicate PDSCH areas. Moreover, in FIG. 3, small boxes with diagonal stripes indicate muted eNB transmission areas. These resource elements are allowed to be muted for eNB power saving. To maintain Release 8 backwards compatibility, OFDM symbols with reference signals are not allowed to be muted.

With the implementation example illustrated in FIG. 3, a maximum eNB transmission power reduction of roughly 5/14=35% can be obtained. With time reserved for power down and up, a more realistic power reduction may be approximately 25%.

It is to be noted that the position and amount of the puncturing pattern shown in FIG. 3 is exemplary and may be modified to comply with different situations. For instance, in case OFDM symbols #9, #10 and #11 are used for CSI-RS (channel state information reference signal), these OFDM symbols are not allowed to be muted. Additionally, in case of a system configured for 4 transmit antenna ports, OFDM symbols #1 and #8 would also need to transmit reference signals, thereby limiting the options for placing the time domain puncturing pattern.

Again referring to FIG. 1, according to an embodiment of the invention, the processor 11 determines time domain fractions of a transmission time interval, which are to be used for transmission of information relating to network operation, as first symbols and the rest of the time domain fractions of the transmission time interval as second symbols. The information relating to network operation may comprise at least one of the following: cell-specific reference signals, a physical downlink control channel, signals for estimating channel state information, synchronization channels and broadcast channels. In the implementation example shown in FIG. 3, the time domain fractions are OFDM symbols, and the OFDM symbols #0, #4, #7 and #11 are determined as first symbols, while the OFDM symbols #1, #2, #3, #5, #6, #8, #9, #10, #12 and #13 are determined as second symbols.

Then the processor 11 determines specific symbols of the second symbols for non-transmission of data, i.e. for muting. In FIG. 3, the specific symbols are the OFDM symbols #8, #9, #10, #12 and #13. The processor 11 may detect a low load situation of the mobile communications network and determine the specific symbols in reaction thereto. The processor 11 may also select a number of the specific symbols in accordance with resources required by user equipments.

The transmitter 13 transmits user data to a user equipment using respective ones of the first symbols in sub-carriers of a physical resource block scheduled for the user equipment which sub-carriers do not transmit the information relating to network operation in the respective ones of the first symbols, and using the second symbols other than the specific symbols in each of the sub-carriers, and inhibit (i.e. mute) transmission on the specific symbols in each of the sub-carriers. As shown in FIG. 3, information relating to network operation is transmitted in OFDM symbol #0 in sub-carriers #0 to #11 of PRBs #0 to #5, and in OFDM symbols #4, #7 and #11 in sub-carriers #1, #4, #7 and #10 in PRBs #0 to #5. User data is transmitted in the resource elements indicated by the grey small boxes, and muted resource elements are indicated by the small boxes with diagonal stripes. Thus, user data is transmitted in OFDM symbols #4, #7 and #11 in sub-carriers #0, #2, #3, #5, #6, #8, #9 and #11, and in OFDM symbols #1, #2, #3, #5 and #6 in the sub-carriers #0 to #11.

The processor 11 increases the bandwidth allocation for the user data to over-provide resources in frequency domain to compensate for the inhibited transmission on the specific symbols in time domain. That is, compared to FIG. 2 showing conventional PRB allocation of two PRBs for a user requesting two PRBs for transmission, the processor 11 may expand the bandwidth of the transmission to six PRBs, i.e. the full bandwidth in the 1.4 MHz system bandwidth configuration.

FIG. 4 shows a flow chart illustrating a method of inhibiting data transmission in time domain fractions of a transmission time interval for power saving according to an embodiment of the invention. In a step S21, time domain fractions of a transmission time interval which can be considered for transmission inhibiting are determined. For example, time domain fractions possible for transmission inhibiting are different from time domain fractions which are to be used for transmission of information relating to network operation. In a step S22, a part of the time domain fractions possible for transmission inhibiting is determined, and transmission inhibiting is performed for this part e.g. in reaction to a low load situation in a mobile communications network. In other words, user data is transmitted to a user equipment using respective ones of the time domain fractions not possible for transmission inhibiting in sub-carriers of a physical resource block scheduled for the user equipment which sub-carriers do not transmit the information relating to network operation in the respective ones of these time domain fractions, and using the time domain fractions possible for transmission inhibiting but different from the part of these time domain fractions which is determined for transmission inhibiting in each of the sub-carriers.

According to an aspect of the invention, an apparatus of a mobile communications network, such as the apparatus 10 in FIG. 1, comprises determining means for determining time domain fractions of a transmission time interval, which are to be used for transmission of information relating to network operation, as first symbols and the rest of the time domain fractions of the transmission time interval as second symbols, and determining specific symbols of the second symbols for non-transmission of data, transmitting means for transmitting user data to a user equipment using respective ones of the first symbols in sub-carriers of a physical resource block scheduled for the user equipment which sub-carriers do not transmit the information relating to network operation in the respective ones of the first symbols, and using the second symbols other than the specific symbols in each of the sub-carriers, and inhibiting means for inhibiting transmission on the specific symbols in each of the sub-carriers. The determining means may comprise the processor 11, and the transmitting means and inhibiting means may comprise the transmitter 13.

The time domain fractions may be orthogonal frequency division multiplex symbols. In the first symbols the transmitting means may transmit cell-specific reference signals and/or a physical downlink control channel and/or signals for estimating channel state information and/or synchronization channels and/or broadcast channels.

The apparatus may comprise detecting means for detecting a low load situation of the mobile communications network and the determining means may determine the specific symbols in reaction thereto. Alternatively or in addition, the apparatus may comprise selecting means for selecting a number of the specific symbols in accordance with resources required by user equipments, and the determining means may determine the respective symbols in reaction thereto. The detecting means and selecting means may comprise the processor 11.

The apparatus may comprise increasing means for increasing a bandwidth assignment for the user data to over-provide resources in frequency domain to compensate for the inhibited transmission on the specific symbols in time domain. The increasing means may comprise the processor 11.

According to an aspect of the invention, in an apparatus of a mobile communications network, time domain fractions of a transmission time interval, which are to be used for transmission of information relating to network operation, are determined as first symbols and the rest of the time domain fractions of the transmission time interval are determined as second symbols, and specific symbols of the second symbols are determined for non-transmission of data. User data is transmitted to a user equipment using respective ones of the first symbols in sub-carriers of a physical resource block scheduled for the user equipment which sub-carriers do not transmit the information relating to network operation in the respective ones of the first symbols, and using the second symbols other than the specific symbols in each of the sub-carriers, and transmission on the specific symbols is inhibited in each of the sub-carriers.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. An apparatus comprising:
   one or more processors; and
   one or more memories including computer program code, the one or more memories and the computer program code configured, with the one or more processors, to cause the apparatus to perform the following:
   determine a portion of time domain fractions of a transmission time interval to be used for transmission of information relating to network operation, said portion being identified as first symbols, the rest of the time domain fractions of the transmission time interval being identified as second symbols;
   determine specific ones of the second symbols for non-transmission of user data by muting;
   transmit user data to a user equipment using respective ones of the first symbols in sub-carriers of a physical resource block scheduled for the user equipment, said sub-carriers not transmitting the information relating to network operation in the respective ones of the first symbols, and using the second symbols, other than the specific ones of the second symbols determined for non-transmission of user data by muting, in each of the sub-carriers for transmission of user data; and inhibit transmission on the specific ones of the second symbols determined for non-transmission of user data by muting in each of the sub-carriers for power saving, wherein said time domain fractions are disposed across the full bandwidth in the frequency domain of the bandwidth being used for transmission.

2. The apparatus of claim 1, wherein the time domain fractions are orthogonal frequency division multiplex symbols.

3. The apparatus of claim 1, wherein the one or more memories and the computer program code are further configured, with the one or more processors, to detect a low load situation of the mobile communications network and determine the specific symbols in reaction thereto.

4. The apparatus of claim 1, wherein the one or more memories and the computer program code are further configured, with the one or more processors, to increase a bandwidth assignment for the user data to over-provide resources in frequency domain to compensate for the inhibited transmission on the specific symbols in time domain.

5. The apparatus of claim 1, wherein the first symbols transmit at least one of the following:

cell-specific reference signals; a physical downlink control channel: signals for estimating channel state information; synchronization channels; and broadcast channels.

6. The apparatus of claim 1, wherein the one or more memories and the computer program code are further configured, with the one or more processors, to select a number of the specific symbols in accordance with resources required by user equipments.

7. A method comprising:

determining a portion of time domain fractions of a transmission time interval to be used for transmission of information relating to network operation, said portion being identified as first symbols, the rest of the time domain fractions of the transmission time interval being identified as second symbols;

determining specific ones of the second symbols for non-transmission of user data by muting;

transmitting user data to a user equipment using the first symbols in sub-carriers of a physical resource block scheduled for the user equipment, said sub-carriers not transmitting the information relating to network operation in the respective ones of the first symbols, and using the second symbols, other than the specific ones of the second symbols determined for non-transmission of user data by muting, in each of the sub-carriers for transmission of user data; and inhibiting transmission on the specific ones of the second symbols determined for non-transmission of user data by muting in each of the sub-carriers for power saving, wherein said time domain fractions are disposed across the full bandwidth in the frequency domain of the bandwidth being used for transmission.

8. The method of claim 7, wherein the time domain fractions are orthogonal frequency division multiplex symbols.

9. The method of claim 7, wherein the specific symbols are determined in reaction to detecting a low load situation of the mobile communications network.

10. The method of claim 7, wherein a bandwidth assignment for the user data is increased to over-provide resources in frequency domain to compensate for the inhibited transmission on the specific symbols in time domain.

11. A computer program product comprising a non-transitory computer-readable storage medium bearing computer program code embodied therein for use with a computer, the computer program code comprising code for performing the method according to claim 5.

12. The method of claim 7, wherein the first symbols transmit at least one of the following:

cell-specific reference signals; a physical downlink control channel: signals for estimating channel state information; synchronization channels; and broadcast channels.

13. The method of claim 7, wherein a number of the specific symbols is selected in accordance with re-sources required by user equipments.

* * * * *